United States Patent Office 3,842,106
Patented Oct. 15, 1974

3,842,106
COMPOSITION CONTAINING HIGHER
FATTY ACIDS
Anatoli Onopchenko, Monroeville, and Johann G. D. Schulz, Pittsburgh, Pa., assignors to Gulf Research & Development Company, Pittsburgh, Pa.
No Drawing. Filed June 5, 1973, Ser. No. 367,177
Int. Cl. C08h 17/36
U.S. Cl. 260—413                5 Claims

ABSTRACT OF THE DISCLOSURE

A composition containing a mixture of $C_{19}$ to $C_{31}$ secondary and tertiary carboxylic acids. The composition, unexpectedly, is a fluid, and can be reacted with polyalkylene polyamine to obtain a polyamide useful in lubricating oils to improve pour and detergency characteristics.

---

This invention is directed to a new composition containing a mixture of secondary and tertiary carboxylic acids having from 19 to 31 carbon atoms, preferably from 19 to 25 carbon atoms.

The composition defined herein can be obtained, for example, by introducing a $C_{18}$ to $C_{30}$ alpha olefin, preferably a $C_{18}$ to $C_{24}$ alpha olefin, or an olefin having a corresponding number of carbon atoms obtained by a disproportionation reaction involving two olefins, as, for example, in U.S. Pat. No. 3,595,920 to Ellis et al. such as 1-octadecene, 2-octadecene, 3-octadecene, 4-octadecene, 5-octadecene, 6-octadecene, 7-octadecene, 8-octadecene, 9-octadecene, 1-nonadecene, 2-nonadecene, 3-nonadecene, 4-nonadecene, 5-nonadecene, 6-nonadecene, 7-nonadecene, 8-nonadecene, 9-nonadecene, 10-nonadecene, 1-eicosene, 2-eicosene, 3-eicosene, 4-eicosene, 5-eicosene, 6-eicosene, 7-eicosene, 8-eicosene, 9-eicosene, 10-eicosene, 1-heneicosene, 2-heneicosene, 3-heneicosene, 4-heneicosene, 5-heneicosene, 6-heneicosene, 7-heneicosene, 8-heneicosene, 9-heneicosene, 10-heneicosene, 11-heneicosene, 1-docosene, 2-docosene, 3-docosene, 4-docosene, 5-docosene, 6-docosene, 7-docosene, 8-docosene, 9-docosene, 10-docosene, 11-docosene, 1-tricosene, 2-tricosene, 3-tricosene, 4-tricosene, 5-tricosene, 6-tricosene, 7-tricosene, 8-tricosene, 9-tricosene, 10-tricosene, 11-tricosene, 12-tricosene, 1-tetracosene, 2-tetracosene, 3-tetracosene, 4-tetracosene, 5-tetracosene, 6-tetracosene, 7-tetracosene, 8-tetracosene, 9-tetracosene, 10-tetracosene, 11-tetracosene, 12-tetracosene, 1-pentacosene, 2-pentacosene, 3-pentacosene, 4-pentacosene, 5-pentacosene, 6-pentacosene, 7-pentacosene, 8 - pentacosene, 9 - pentacosene, 10-pentacosene, 11-pentacosene, 12-pentacosene, 13-pentacosene, 1-hexacosene, 2-hexacosene, 3-hexacosene, 4-hexacosene, 5-hexacosene, 6-hexacosene, 7-hexacosene, 8-hexacosene, 9-hexacosene, 10-hexacosene, 11-hexacosene, 12-hexacosene, 13-hexacosene, 1-heptacosene, 2-heptacosene, 3-heptacosene, 4-heptacosene, 5-heptacosene, 6-heptacosene, 7-heptacosene, 8-heptacosene, 9-heptacosene, 10-heptacosene, 11-heptacosene, 12-heptacosene, 13-heptacosene, 14 - heptacosene, 1 - octacosene, 2 - octacosene, 3-octacosene, 4-octacosene, 5-octacosene, 6-octacosene, 7-octacosene, 8-octacosene, 9-octacosene, 10-octacosene, 11-octacosene, 12-octacosene, 13-octacosene, 14-octacosene, 1-nonacosene, 2-nonacosene, 3-nonacosene, 4-nonacosene, 5 - nonacosene, 6 - nonacosene, 7 - nonacosene, 8-nonacosene, 9-nonacosene, 10-nonacosene, 11-nonacosene, 12-nonacosene, 13-nonacosene, 14-nonacosene, 15-nonacosene, 1-triacontene, 2-triacontene, 3-triacontene, 4-triacontene, 5-triacontene, 6-triacontene, 7-triacontene, 8-triacontene, 9-triacontene, 10-triacontene, 11-triacontene, 12-triacontene, 13-triacontene, 14-triacontene, 15-triacontene, 5-methyl-1-octadecene, 3,3-dimethyl-1-octadecene, 3 - phenyl - 2 - octadecene, 4-chloro-1-eicosene, 5-bromo-3-eicosene, etc. (with the internal olefins being either the cis or trans isomer or mixtures thereof), or any combination thereof into a reactor containing sulfuric acid under a carbon monoxide pressure, adding water to the reaction mixture and thereafter recovering the desired mixture of carboxylic acids having one or more carbon than the reactant olefin. The sulfuric acid used must be substantially anhydrous, that is, from about 92 to about 100 percent aqueous solution, preferably in the range of about 95 to about 98 percent. The molar ratio of sulfuric acid to olefin is from about 3:1 to about 20:1, preferably from about 5:1 to about 10:1. The pressure can be in the range of about 100 to about 5000 pounds per square inch gauge (about seven to about 352 kilograms per square centimeter), preferably in the range of about 500 to about 2000 pounds per square inch gauge (about 35.2 to about 140.8 kilograms per square centimeter), the temperature in the range of about $-15°$ C. to about $100°$ C., preferably about $0°$ C. to about $40°$ C., and the reaction time about 0.01 to about 12 hours, preferably in the range of about 0.1 to about four hours. The reaction mixture, after depressuring is added to water and the mixture of carboxylic acids formed as a result thereof floats on the surface thereof. Simple decantation will suffice for recovery of the mixture of carboxylic acids.

The composition defined herein can be illustrated by the following. In order to characterize the unique composition herein we carried out two preliminary runs wherein a $C_6$ normal alpha olefin and a $C_8$ normal alpha olefin were treated with sulfuric acid, carbon monoxide and then water, as shown in Examples I and II below, respectively.

Example I

Into a one-liter, 316 stainless steel, magnetically-stirred autoclave containing 540 grams of 97 percent aqueous sulfuric acid and under a carbon monoxide pressure of 1300 pounds per square inch gauge (91.6 kilograms per square centimeter), there was introduced, with stirring, over a period of 1.9 hours, 187 grams of 1-hexene. When the addition of olefin was completed, the resulting mixture was permitted to react for an additional 18 minutes. The temperature during the reaction was maintained constant at about $25°$ C. At the end of the reaction period the crude mixture in the autoclave was depressured into a vessel containing about 1200 grams of wet ice and the organic layer that formed on standing was separated in a separatory funnel and washed several times with approximately an equal volume of a hot 15 percent aqueous solution of sodium chloride until the final washings were neutral to litmus paper. Work-up by distillation resulted in a major fraction, 146 grams, having a boiling point range of about $68°$ C. to about $75°$ C. at 3.8 mm. of mercury. Analysis of the product by vapor phase chromatography showed the product to consist of 2-heptanoic acid (11.1 weight percent), 3-heptanoic acid (22.2 weight percent), 2-methyl-2-hexanoic acid (39.5 weight percent) and 3-methyl-3-hexanoic acid (27.2 weight percent). The weight ratio of tertiary (neo) acids to secondary (iso) acids was about 2:1. The ratio of methyl protons to methylene and methine by nuclear magnetic resonance was about 1.6:1.0, which is in complete accord with detailed chromatographic analysis. The extent of branching in the product can also be assessed on the basis of methyl protons at 0.9 parts per million for a terminal methyl group and at 1.07 and 1.1 for non-terminal methyl group protons in the nuclear magnetic resonance spectrum. The amount of isolated $C_7$ acid mixture corresponded to an efficiency of 70 percent and had a neutral equivalent value of 135 (theoretical value 130).

Example II

About 180 grams of 1-octene and 540 grams of 97 percent aqueous sulfuric acid were reacted as in Example I for a period of 1.9 hours at a temperature of 28° C. and an initial carbon monoxide pressure of 1300 pounds per square inch gauge (91.6 kilograms per square centimeter). On work-up by distillation there was obtained 185.2 grams of a fraction consisting essentially of $C_9$ carboxylic acids having a boiling point range of 108° C. to 113° C. at 4 millimeters of mercury. Analysis of the product mixture by vapor phase chromatography showed the presence of the following isomeric acids: 4-nonanoic acid (9.0 weight percent), 3-nonanoic acid (10.5 weight percent), 2-nonanoic acid (16.4 weight percent), 4-methyl-4-octanoic acid (16.4 weight percent), 3-methyl-3-octanoic acid (34.3 weight percent) and 2-methyl-2-octanoic acid (25.0 weight percent). The ratio of neo acids to secondary acids was about 3:1. The ratio of methyl protons to methylene and methine by nuclear magnetic resonance was about 0.96:1 in complete agreement with detailed chromatographic analysis. The amount of isolated $C_9$ acids correspond to an efficiency of about 74 percent and had a neutral equivalent value of 162 (theoretical value 158).

Example III

About 224 grams of 1-octadecene and 444 grams of 97 percent aqueous sulfuric acid were reacted as in Example I for a period of 4.3 hours at a temperature of 24° C. and an initial carbon monoxide pressure of about 1350 pounds per square inch gauge (95.1 kilograms per square centimeter). On work-up by distillation there was obtained 199.2 grams (78 percent efficiency) of a fraction possessing the following physical properties:

| | |
|---|---|
| Neutral equivalent | 312 (theoretical 299). |
| Specific gravity, 15.5° C. | 0.8820. |
| Viscosity, centistokes: | |
| 98.9° C. | 7.09. |
| 135° C. | 3.44. |
| 148° C. | 2.77. |
| Titer test, ° C. | 1.2. |
| Boiling point, ° C. | 200–205 at about 1.5 mm. Hg. |
| Refractive index, 27.5° C. | 1.4512. |
| Iodine number | 1.2. |

The recovered fraction was subjected to vapor phase chromatography and it was found that the weight ratio of secondary carboxylic acids to tertiary was about 52:48. The remainder of the product (17.4 grams) consisted of about 78 weight percent of $C_{39}$ carboxylic acids.

On the basis of our findings in Examples I and II above, the carboxylic acids obtained herein, for example, in this Example III, can be defined as falling within the following two general structures:

Tertiary (Neo) Carboxylic Acids

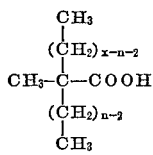

wherein $x$ is the number of carbon atoms in the reactant olefin, that is, from 18 to 30 carbon atoms, preferably from about 18 to 24, and $n$ is the integer 2, 3, 4 up to $x/2$ for even integers between 18 and 30 and 2, 3, 4 up to $$\frac{x+1}{2}$$

for odd integers between 18 and 30, and

Secondary (Iso) Carboxylic Acids

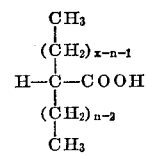

wherein $x$ is as defined above, and $n$ is the integer 2, 3, 4 up to $x/2$ for even integers between 18 and 30 and 2, 3, 4 up to $$\frac{x+1}{2}$$

for odd integers between 18 and 30. About half of the carboxylic acids obtained are tertiary and about half secondary. Accordingly, the mixture obtained using 1-octadecene as the olefinic charge results in a mixture containing the following $C_{19}$ carboxylic acids: 2-nonadecanoic acid, 3-nonadecanoic acid, 4-nonadecanoic acid, 5-nonadecanoic acid, 6-nonadecanoic acid, 7-nonadecanoic acid, 8-nonadecanoic acid, 9-nonadecanoic acid, 2-methyl-2-octadecanoic acid, 3-methyl-3-octadecanoic acid, 4-methyl-4-octadecanoic acid, 5-methyl - 5 - octadecanoic acid, 6-methyl-6-octadecanoic acid, 7-methyl-7-octadecanoic acid, 8-methyl-8-octadecanoic acid and 9-methyl-9-octadecanoic acid.

Surprisingly, the above mixture is a fluid at room temperature and can, therefore, be readily handled in many chemical applications. That it is surprising that the mixture obtained herein is a fluid at room temperature is apparent from the following data of the following individual $C_{19}$ carboxylic acids:

| Carboxylic acid | Melting point, ° C. | Chemical abstract Volume number | Page number |
|---|---|---|---|
| 2-nonadecanoic acid | 55–56 | 49 | 1547c |
| 4-nonadecanoic acid | 45–46 | 49 | 1547c |
| 5-nonadecanoic acid | 39.1–39.6 | 49 | 1547c |
| 6-nonacecanoic acid | 37–38 | 49 | 1547c |
| 7-nonadecanoic acid | 36–36.1 | 49 | 1547c |
| 8-nonadecanoic acid | 34–35 | 49 | 1547c |
| 9-nonadecanoic acid | 34–36 | 49 | 1547c |
| 3-methyloctadecanoic acid | 43.9–44.1 | 44 | 1408f |
| 3,3-dimethylheptadecanoic acid | 40.5–41 | 53 | 7000e |

The above mixture was compared with commercial carboxylic acids sold by Emery Industries, Isostearic Acids 871 and 875, which possess comparable neutral equivalents and boiling points. We detected nonterminal methyl group protons in our $C_{19}$ mixture at 1.07 and 1.12 parts per million in the nuclear magnetic resonance spectrum, along with the terminal methyl group proton at 0.87 parts per million. Emery's 871 and 875 products showed the absence of peaks at 1.07 and 1.12 parts per million, but showed methyl group protons at 0.87 parts per million in the nuclear magnetic resonance spectrum. The ratio of methyl group protons to that of methylene and methine was 0.29:1. Additionally Emery's products had peaks at 2.2 parts per million, which were completely absent from the spectrum of the above $C_{19}$ mixture. The vapor phase chromatograms were also different.

Example IV

About 252 grams of 1-eicosene and 576 grams of 97 percent aqueous sulfuric acid were reacted as in Example I for a period of six hours at a temperature of 30° C. and an initial carbon monoxide pressure of about 1000 pounds per square inch gauge (70.5 kilograms per square centimeter). On work-up by distillation there was obtained 248 grams (85 percent efficiency) of a liquid fraction possessing the following physical properties:

Neutral equivalent _____ 333 (theoretical 326).
Specific gravity, 15.5° C. __ 0.8803.
Boiling point, ° C. _____ Around 210 at 1.2 mm. Hg.
Refractive index, 27.5° C. _ 1.4528.
Iodine number _____ 2.0.

The recovered fraction was subjected to vapor phase chromatography and it was found that the weight ratio of secondary carboxylic acids to tertiary was about 47:53. The following $C_{21}$ carboxylic acids are in the recovered fraction: 2-methyl-2-eicosanoic acid, 3-methyl-3-eicosanoic acid, 4-methyl-4-eicosanoic acid, 5-methyl-5-eicosanoic acid, 6-methyl-6-eicosanoic acid, 7-methyl-7-eicosanoic acid, 8-methyl-8-eicosanoic acid, 9-methyl-9-eicosanoic acid, 10-methyl-10-eicosanoic acid, 2-heneicosanoic acid, 3-heneicosanoic acid, 4-heneicosanoic acid, 5-heneicosanoic acid, 6-heneicosanoic acid, 7-heneicosanoic acid, 8-heneicosanoic acid, 9-heneicosanoic acid, and 10-heneicosanoic acid.

Surprisingly, the above mixture is also a fluid at room temperature, as will be apparent from a consideration of the following data regarding individual $C_{21}$ carboxylic acids:

| Carboxylic acid | Melting point, °C. | Chemical abstract Volume number | Page number |
|---|---|---|---|
| 2-methyleicosanoic acid | 61.8–62.0 | 49 | 889b |
| 2-ethylnonodecanoic acid | 52 | 54 | 5453f |
| 2,2-dimethylnonadecanoic acid | 67.2–67.7 | 52 | 8946a |
| 3-methyleicosanoic acid | 52.2–52.4 | 49 | 3800c |
| 7-heneicosanoic acid | 44.6–45.5 | 49 | 1547c |
| 8-heneicosanoic acid | 45.8–46.7 | 49 | 1547c |
| 9-heneicosanoic acid | 45.8–46.7 | 49 | 1547c |
| 10-heneicosanoic acid | 45.5–47.5 | 49 | 1547c |
| 11-heneicosanoic acid | 54–55 | 49 | 1547c |

Example V

About 220 grams of a normal $C_{18-24}$ alpha olefin mixture and 445 grams of 97 percent aqueous sulfuric acid were reacted as in Example I for a period of 4½ hours at a temperature of 30° C. and an initial carbon monoxide pressure of about 1350 pounds per square inch gauge (95.1 kilograms per square centimeter). The alpha olefin feed had an average molecular weight of 295 and contained 3.3 weight percent of 1-octadecene, 51 weight percent of 1-eicosene, 37.9 weight percent of 1-docosene and 7.8 weight percent of 1-tetracosene. On work-up of product by distillation there was obtained 149 grams (71 weight percent efficiency) of a liquid fraction of $C_{19}$ to $C_{25}$ carboxylic acids possessing the following physical properties:

Neutral equivalent _____ 356.
Specific gravity, 15.5° C. _ 0.8789.
Viscosity, centistokes:
  98.9° C. _____ 9.00.
  135° C. _____ 4.25.
  148° C. _____ 3.39.
Titer test, 0° C. _____ 12.9.
Boiling point, ° C. _____ 220–230 at about 1 mm. Hg.
Refractive index, 27.5° C. 1.4536.
Iodine number _____ 1.4.

The mixture obtained contains 76 isomers, 16 $C_{19}$ carboxylic acids from the $C_{18}$ olefin charge, 18 $C_{21}$ carboxylic acids from the $C_{20}$ olefin charge, 20 $C_{23}$ carboxylic acids from the $C_{22}$ olefin charge and 22 $C_{25}$ carboxylic acids from the $C_{24}$ olefin charge, with half of the isomers at an individual carbon number level being secondary and half being tertiary carboxylic acids.

Example VI

About 220 grams of an olefinic mixture containing $C_{18}$ internal olefins and 440 grams of 97 percent aqueous sulfuric acid were reacted as in Example I for a period of about seven hours at a temperature of 24° C. and an initial carbon monoxide pressure of 1350 pounds per square inch gauge (95.1 kilograms per square centimeter). The olefinic feed was prepared by following the procedure in U.S. Pat. No. 3,595,920 to Ellis et al., that is, 1000 grams of 1-decene were contacted with five percent by weight of a composition containing alumina, molybdenum and silver, wherein the silver constituted 3.7 weight percent of the composition, at a temperature of 175° C. for four hours. The composition of the olefinic feed was as follows:

| Carbon number of internal olefin: | Weight percent |
|---|---|
| $C_{12}$ | 0.3 |
| $C_{13}$ | 1.1 |
| $C_{14}$ | 1.2 |
| $C_{15}$ | 2.3 |
| $C_{16}$ | 1.6 |
| $C_{17}$ | 7.8 |
| $C_{18}$ | 85.3 |
| $C_{19}$ | 0.4 |

The olefinic charge had an average molecular weight of 247.

On work-up by distillation there was obtained 227.5 grams (88 percent efficiency) of a liquid fraction possessing the following physical properties:

Neutral equivalent _____ 310.
Specific gravity, 15.5° C. _____ 0.8842.
Boiling point, ° C. _____ 200–205 at about 1.5 mm. Hg.

Viscosity, centistokes:
  98.9° C. _____ 6.77.
  135° C. _____ 3.32.
  148° C. _____ 2.77.
Titer test, ° C. _____ 6.3.
Refractive index, 27.5° C. _____ 1.4507.
Iodine number _____ 4.2.

Analysis of the product by vapor phase chromatography indicated the product consisted of 51.3 weight percent tertiary carboxylic acids having mostly 19 carbon atoms and 48.7 weight percent secondary carboxylic acids having mostly 19 carbon atoms. Analysis by nuclear magnetic resonance spectroscopy for the ratio of total methyl group protons to that of methylene and methine gave a ratio of about 0.34 to 1.0. The nuclear magnetic resonance spectrum and the vapor phase chromatogram of this product were virtually superimposable with the product obtained in Example III.

The mixture of carboxylic acids obtained herein can be reacted with a polyalkylene polyamine to obtain a polyamide which can be added to a lubricating oil to improve its pour and detergency characteristics, as shown in more detail in application Ser. No. 367,179 by Robert J. Hartle entitled Lubricating Oil Containing a Polyamide Pour Point Depressant, filed concurrently herewith.

Obviously, many modifications and variations of the invention, as hereinabove set forth, can be made without departing from the spirit and scope thereof, and, therefore, only such limitations should be imposed as are indicated in the appended claims.

We claim:
1. A composition containing a mixture of carboxylic acids falling within each of the following general structures:

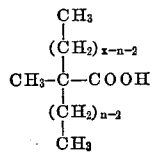

wherein $x$ is a number from 18 to 30 and $n$ is the integer 2, 3, 4 up to $x/2$ for even integers between 18 and 30 and 2, 3, 4 up to $$\frac{x+1}{2}$$

for odd integers between 18 and 30, and

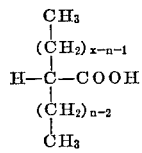

wherein $x$ is a number from 18 to 30 and $n$ is the integer 2, 3, 4 up to $x/2$ for even integers between 18 and 30 and 2, 3, 4 up to $$\frac{x+1}{2}$$

for odd integers between 18 and 30.

2. The composition of claim 1 wherein $x$ is the number from 18 to 24.

3. The composition of claim 1 wherein approximately half of the carboxylic acids in the mixture are tertiary and approximately half are secondary.

4. The composition of claim 1 wherein the following carboxylic acids are present therein: 2-nonadecanoic acid, 3-nonadecanoic acid, 4-nonadecanoic acid, 5-nonadecanoic acid, 6-nonadecanoic acid, 7-nonadecanoic acid, 8-nonadecanoic acid, 9-nonadecanoic acid, 2-methyl-2-octadecanoic acid, 3-methyl-3-octadecanoic acid, 4-methyl-4-octadecanoic acid, 5-methyl-5-octadecanoic acid, 6-methyl-6-octadecanoic acid, 7-methyl-7-octadecanoic acid, 8-methyl-8-octadecanoic acid and 9-methyl-9-octadecanoic acid.

5. The composition of claim 1 wherein the following carboxylic acids are present therein: 2-methyl-2-eicosanoic acid, 3-methyl-3-eicosanoic acid, 4-methyl-4-eicosanoic acid, 5-methyl-5-eicosanoic acid, 6-methyl-6-eicosanoic acid, 7-methyl-7-eicosanoic acid, 8-methyl-8-eicosanoic acid, 9-methyl-9-eicosanoic acid, 10-methyl-10-eicosanoic acid, 2-heneicosanoic acid, 3-heneicosanoic acid, 4-heneicosanoic acid, 5-heneicosanoic acid, 6-heneicosanoic acid, 7-heneicosanoic acid, 8-heneicosanoic acid, 9-heneicosanoic acid and 10-heneicosanoic acid.

References Cited
UNITED STATES PATENTS

| | | | |
|---|---|---|---|
| 2,585,723 | 2/1952 | Banes et al. | 260—413X |
| 3,405,064 | 10/1968 | Miller | 252—51.5 |

LEWIS GOTTS, Primary Examiner

E. G. LOVE, Assistant Examiner

U.S. Cl. X.R.

44—58; 252—51.5 A; 260—533 A.